(12) United States Patent
Bass et al.

(10) Patent No.: US 6,633,920 B1
(45) Date of Patent: Oct. 14, 2003

(54) METHOD AND SYSTEM FOR NETWORK DATA FLOW MANAGEMENT WITH IMPROVED COMPLETION UNIT

(75) Inventors: Brian Mitchell Bass, Apex, NC (US); Jean Louis Calvignac, Cary, NC (US); Marco C. Heddes, Raleigh, NC (US); Steven Kenneth Jenkins, Raleigh, NC (US); Michael Steven Siegel, Raleigh, NC (US); Fabrice Jean Verplanken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,028

(22) Filed: Jan. 7, 2000

(51) Int. Cl.[7] .............................................. G06F 13/00
(52) U.S. Cl. ..................................................... 709/246
(58) Field of Search ............................ 709/1, 100, 102, 709/105, 106, 107, 200, 201, 230, 231, 232, 246; 370/335, 360, 389

(56) References Cited

U.S. PATENT DOCUMENTS

| 4,703,475 | A |   | 10/1987 | Dretzka et al. | 370/60 |
|---|---|---|---|---|---|
| 4,775,987 | A |   | 10/1988 | Miller | 375/38 |
| 5,357,632 | A |   | 10/1994 | Pian et al. | 395/650 |
| 5,379,297 | A |   | 1/1995 | Glover et al. | 370/60.1 |
| 5,426,645 | A |   | 6/1995 | Haskin | 370/118 |
| 5,461,614 | A |   | 10/1995 | Lindholm | 370/60 |
| 5,550,978 | A |   | 8/1996 | Takahashi et al. | 395/200.01 |
| 5,748,905 | A |   | 5/1998 | Hauser et al. | 395/200.79 |
| 5,828,903 | A |   | 10/1998 | Sethuram et al. | 395/817 |
| 5,870,394 | A |   | 2/1999 | Oprea | 370/392 |
| 5,872,784 | A |   | 2/1999 | Rostoker et al. | 370/395 |
| 5,950,182 | A |   | 9/1999 | Godbole et al. | 760/45 |
| 6,404,752 | B1 | * | 6/2002 | Allen et al. | 370/335 |

OTHER PUBLICATIONS

International Search Report–PCT–Jun. 25, 2001.

* cited by examiner

*Primary Examiner*—Robert B Harrell
(74) *Attorney, Agent, or Firm*—Kenneth A. Seaman (57) ABSTRACT

A system and method of data flow management, particularly in a multiple network processor architecture where a plurality of independent processing units are simultaneously processing information from different frames of input information. The present invention includes first-in-first-out files identifying the individual frames and correlating the frames with the processor to which the frames have been assigned for processing as well as a first-in-first-out file of processed frames for each processor to allow the frames to be processed independently, then reassembled into the same order as the frames had been received without communication between the independent processors. Additionally, the present system supports newly-created frames as well as the concept of flushing the system without regard to frame order whereby frames are sent out to the network as the processing is completed without regard to input order, overriding the system of putting the output frames in the same order as the input frames were received from the network.

10 Claims, 7 Drawing Sheets

FIG. 1

FIG. 2
BLOCK DIAGRAM OF THE EPC

METHOD AND SYSTEM FOR NETWORK DATA FLOW MANAGEMENT WITH IMPROVED COMPLETION UNIT

CROSS REFERENCE TO RELATED PATENTS

The present invention is related to the following patent application which is specifically incorporated herein by reference:

Application for U.S. patent Ser. No. 09/384,691 filed Aug. 27, 1999, by Brian Bass et al. for "Network Processor Processing Complex and Method". This patent is sometimes referred to herein as the Network Processing Unit Patent (or the NPU Patent).

BACKGROUND OF THE INVENTION

1. Field of the Invention

The present invention relates to communications network apparatus such as is used to link together information handling apparatus or computers of various types. More particularly, the present invention relates to an improved system and method for managing data flow in a processing device coupled to a data transmission network, including a method and system for handling a plurality of input information units (or frames) which may be simultaneously processed by a plurality of independent processors, creating a plurality of processed or output information units.

2. Background Art

A certain amount of background information on the subject of data transmission networks (also sometimes referred to as communication networks)—and the systems which allow such networks to efficiently interchange data—is presupposed at the outset. Such communications networks typically employ devices which are referred to as switches and routers in moving packets of information (sometimes referred to as frames) between information handling devices.

The International Standards Organization (sometimes referred to as ISO) has proposed an architectural model to describe the framework of the network, which model is divided into layers. A typical architecture based upon the ISO model extends from layer 1 (which is sometimes referred to as "L1") being the physical pathway or media through which signals are passed upward through layers 2, 3, 4 and so forth up to Layer 7, with Layer 7 being the layer of application programming on a computer system linked to the network. Throughout this document, mention of the terms L1, L3, etc., are intended to refer to the layers of a network architecture.

In the present day use of a network, bandwidth of the network is a crucial measurement. The "traffic" on a network continues to increase at a rapid pace, requiring more and more of the network and the components which regulate the flow of information over the network and direct the information to the appropriate location.

The increase in network traffic has been dramatic in recent years, driven, at least in part, by the explosive growth of the Internet, and, to a lesser extent, the growth of private data networks or intranets. In either case, a person at one location can access a potentially large amount of information and data processing resources which are physically located at a remote location by sending messages back and forth across a network, often requiring many interconnections between data processing systems and networks along the way.

The Internet has traditionally been a network in which data packets are carried without incremental charge. As the Internet continues to expand and the technology improve in areas like reliability and security, it has presented an opportunity to transmit many different kinds of information, including mixtures of different types of information relatively simultaneously. So, it has been proposed to send voice and data concurrently in hardware and software systems arrangements which have come to be called "voice over asynchronous transmission mode" (or "VoATM") or "voice over frame relay ("or VOFR")—examples of "voice over data" systems of network transmissions. These allows the voice transmissions (typically telephone-like communications services) to use cost effective transmission medium (the Internet) using communication technique of choice (such as ATM). Of course, there are always considerations beyond the cost of service, like quality of service to consider (reliability, response time, security of data from alteration and eavesdropping) in choosing a service and a transmission, but the amount of data flowing through the networks like the Internet and the analogous private data networks continues to expand at a very rapid rate.

The expanding amount of data flowing over the network requires that new and more efficient hardware and software be used with the data transmission networks to handle the increased amount of data and handle it faster and with greater accuracy and reliability. Data transmission networks handle a large and increasing amount of data, particularly since the Internet has come into existence. In addition, the number of private data networks has been steadily increasing as the desire for access to more remote data and data processing capabilities has become apparent.

System for handling data are known in the prior art which include rigid first-in-first out processing of data. While this works fine when the processing occurs in a routine fashion, such a system is bound up and stops functioning when the processing of one input is delayed. The delay of the processing of one input unit has the effect of stopping the processing of others.

Other systems are known which keep track of input message units during processing. These systems have the limitation and disadvantage that a significant amount of processing power must be devoted to keeping track of what information unit is where in the system, and some do not accommodate additional input information units, e.g., from new data flows or from internally generated messages.

Other disadvantages and limitations of the prior art systems will be apparent to those skilled in the art in view of the following description of the present invention.

SUMMARY OF THE INVENTION

The present invention overcomes the disadvantages and limitations of the prior art system by providing a system for managing the data flow over a network which is simple, yet efficient, in handling the data.

The present invention has the advantage that it allows input information units (or input frames) from a single data flow to be assigned to one of a plurality of independent processors for processing, then allow the output information units (or completed frames) processed reassembled into the same order in which the input frames were received.

The present invention also has the advantage that multiple data flows can be processed without influencing each other, and one data flow will not block the other data flows. That is, when the processing of one data flow is halted awaiting completion of the processing of one portion thereof, the other data flows can continue.

The present invention also allows a flushing of the system or immediate dispatching of completed frames without regard to order, if desired, overriding the normal operation of handling each data flow in the order in which it was received.

The present invention also has the advantage that it is efficient in its use of buffers and storage devices. The present invention also has the advantage that it operates quickly, so that the speed of the processing is not reduced by the overhead of managing the data flows.

The present invention has the advantage that it is simple and easy to implement, with a minimum of additional hardware and/or software elements. By having a relatively simple design, the cost to design and implement the completion unit of the present invention is not great. Further, by implementing the design in hardware which is processing concurrently with the frame processing, the impact on the speed of processing is negligible.

Through the use of the present invention, multiple processing units may be independent one of the other, yet process the same data flow without allowing portions to get into a different and undesirable order. The output of processed information units for a given data flow will be in the same order as the system received input frames from that data flow, unless overridden by a flush command.

The present invention allows for the insertion of new data flows and the creation of information units by the system without affecting the processing which maintains the order of the data flows received from the network.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus described some of the limitations of the prior art systems and some objects and advantages of the present invention, other objects and advantages will be apparent to those skilled in the art in view of the following figures illustrating the present invention in which:

DETAILED DESCRIPTION OF THE PREFERRED EMBODIMENTS

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
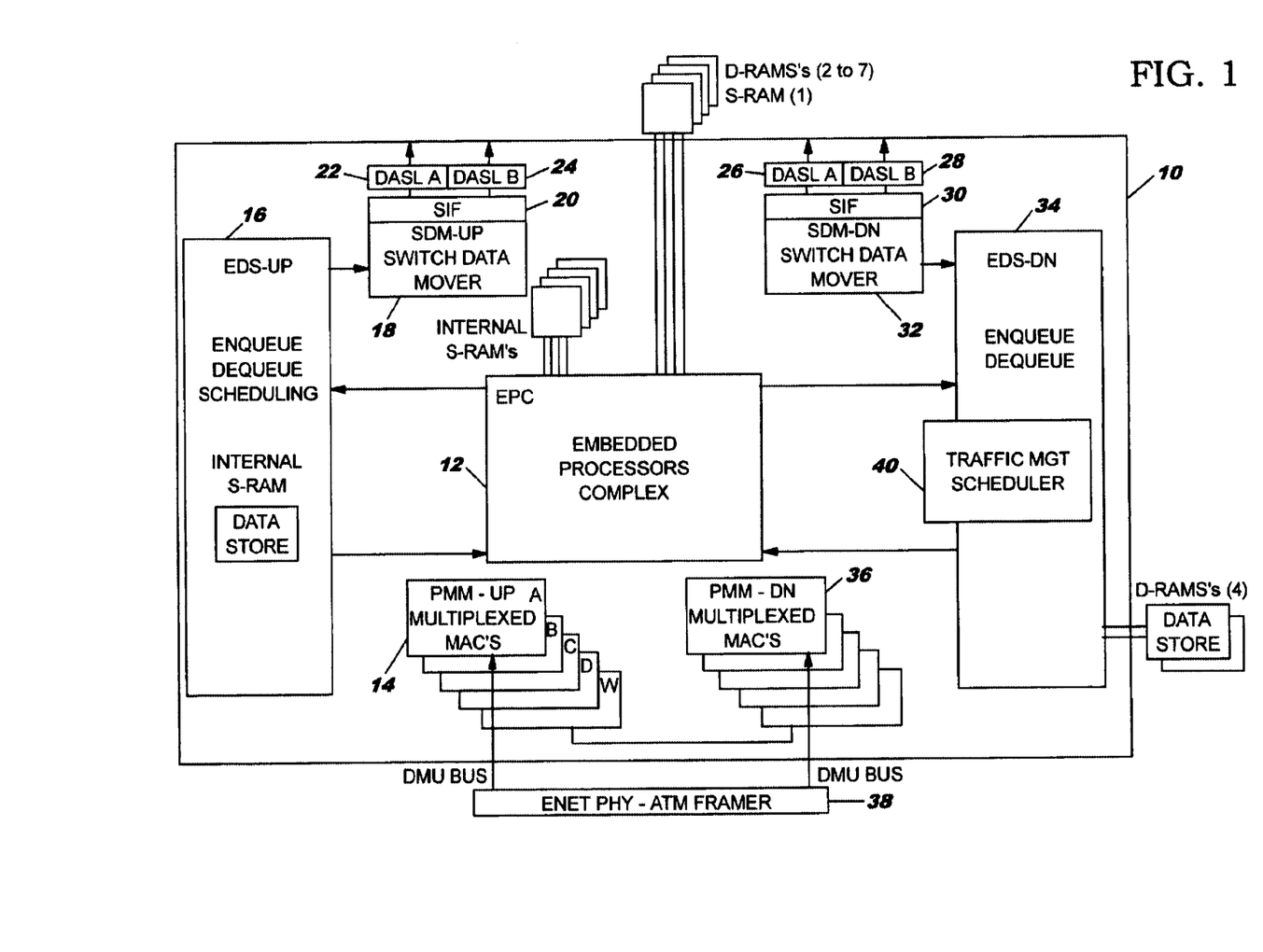
FIG. 1 shows a block diagram for an interface device of the type useful in the present invention, including a plurality of embedded processor complexes.

FIG. 1 is a functional block diagram of a processing system suitable for attachment to a data transmission network for receiving, processing and re-transmissiting data to the network in the form of packets or information units. Preferably, these packets or information units (also sometimes referred to as frames, terms which, for the purpose of the present document will be used interchangeably) have a predetermined format (or one of limited number of predefined formats) following along the standards set forth for data transmissions such as IEEE or ISO.

As shown in FIG. 1, the functional block diagram for a system for data processing of the type which is attached to a data transmission network includes a plurality of subassemblies, which, as described in the NPU Patent, are advantageously integrated into a single substrate. The integration of the entire assembly on a single substrate allows for closely packing the various components of the system, reducing the time needed for communication between components and therefore increasing the speed at which the system can operate. The use of a single substrate for the multiple processors and supporting logic and memory also can reduce the incidence of failures due to interconnection and increase the resistance to noise or other stray signals which might corrupt the data transmission in the network.

The subassemblies mounted on the substrate 10 and comprising the interface device of the present invention include a set of upside elements and a set of downside elements, with up and down referring to data flowing from the network up to the interface device (for the upside) and data flowing from the interface device down toward the network (for the downside), although the use of these directions is somewhat arbitrary and useful for logically separating the components of the data flows into a set of devices which are useful for incoming data (the up or ingress side of the device) and another set of components which are useful for the outflow of data from the interface device or chip (the down or egress side of the device).

Figure 2:
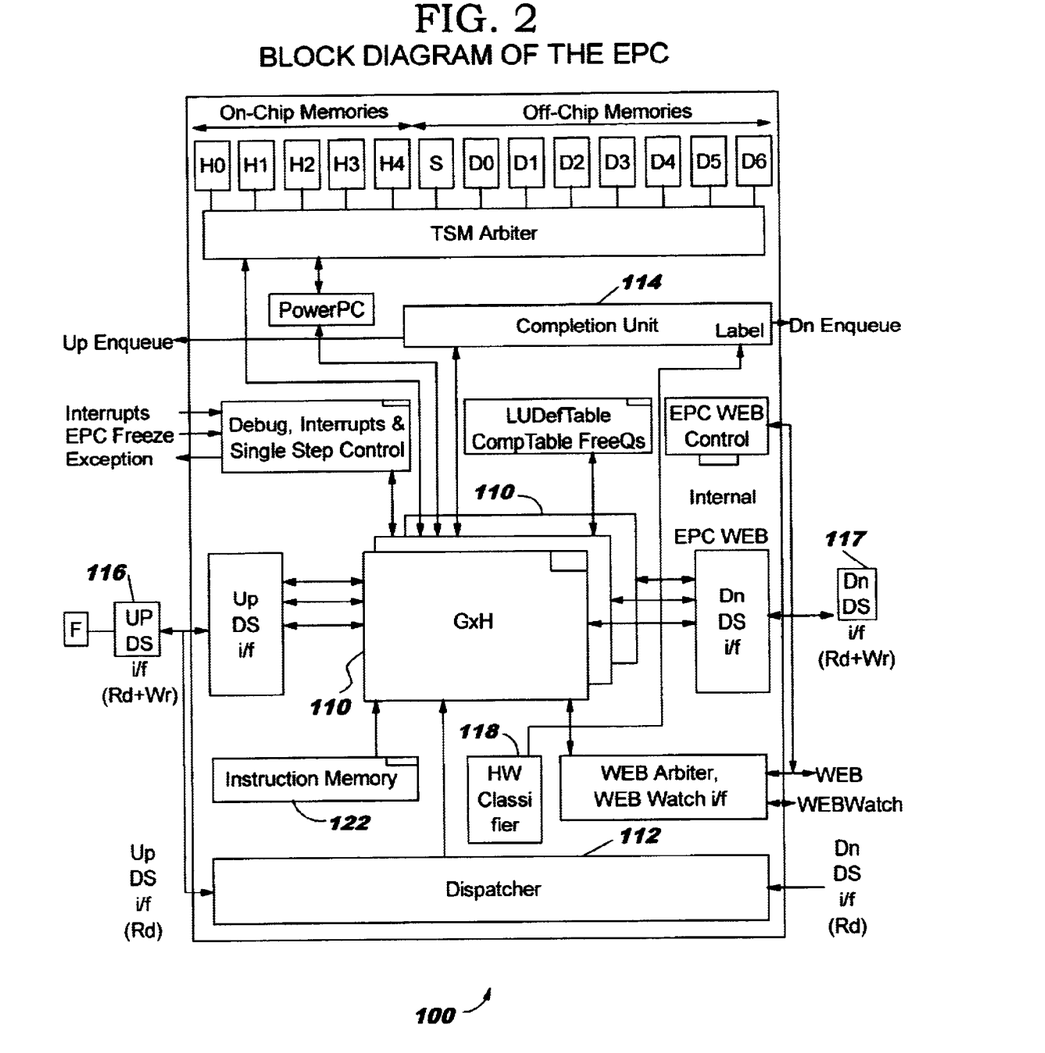
FIG. 2 shows a block diagram of the embedded processor complex includes as a part of FIG. 1 with its completion unit.

FIG. 2 illustrates the basic architecture for the network processing unit complex which is more fully described in the NPU Patent mentioned above. The network processing unit complex 100 includes a plurality of processing complexes 110, preferably of the type described in detail in the NPU Patent. A frame F (also known as an input information unit or a packet) is received from the network and is placed into an UP data store UP DS 116 which is connected to the processing units 110 through an interface UP DS i/f which has the capabilities to read and write to the data store. Also connected to the data store is a dispatcher 112 which recognizes when a frame or packet for processing has been received and identifies one of the processing units 110 to which that packet or unit F will be assigned for processing. Concurrently with the dispatcher sending a frame to a processing unit for processing, a classifier hardware assist 118 identifies the type of message format and identifies key information about the input unit such as the starting address and the location of the L3 header. The processors 110 have access to an instruction memory 120 which store and provide the routines to be carried out by the processors 110, but the details of those routines are not particularly relevant to the present invention and accordingly are not detailed in this document. A completion unit 114 is operatively coupled between the plurality of processors 110 and the down enqueue system (labeled DN Enqueue) 34 as well as an UP enqueue system 16. The DN Enqueue system 34 is used to send completed information units out from the processing complex down to the network or other system to which the complex is attached and the UP enqueue system 16 is used to send processed units to the switch fabric.

Frames or input information units typically arrive with identifying information such as a message number (sometimes referred to as a MAC) and the address of the source of the message (sometimes designated as SA) and destination (sometimes designated as DA) of the frame. The location and content of such information may vary depending on the format of the message and its encapsulation technique, but this information allows the frame to be properly routed to the destination through the system and the switches and routers and to be assembled into a complete message in the proper order, even if the entire message is longer than a single frame. Typically, the components of a message are referred to as a data flow and each portion of the data flow would include the same identifying information (such as a MAC, SA and DA). The actual label assigned to an input information unit may be created in a variety of ways, such as the MAC–SA+DA, or by logically XOR-ing the LID with the MID fields in other message formats.

Figure 3:
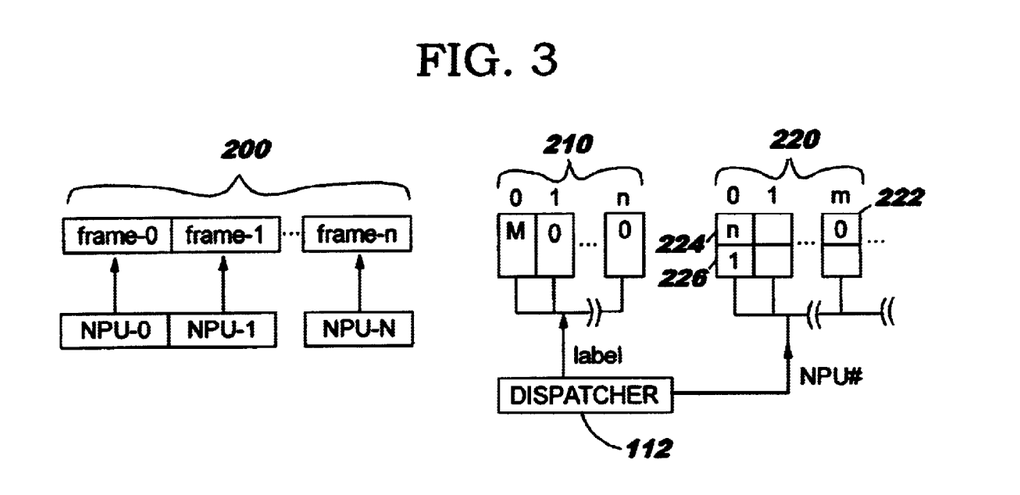
FIG. 3 is a functional block diagram of the completion unit shown in FIG. 2 showing the function of the completion unit at a high level.

When the dispatcher 112 recognizes that an input information unit has been received, it finds a processing unit which is idle and available for receiving and processing that input information unit. Once such a processing unit is identified, the input information unit is sent to that unit and the identity of the message and the identity of the processor handling it will be known. As shown in FIG. 3, storage in three lists or queues may be created for each frame. First, a queue 200 of processed frames is defined to hold completed work (an output or processed frame, received from the processor which processed a given frame), requiring a buffer or memory space for at least one completed frame for each processor, shown as frame-0 to frame-N where processors identified as NPU-0 through NPU-N are coupled to the respective frame. When the dispatcher 112 sends a frame to a processing unit, it sends the identifier for that frame to a second memory or queue 210 which includes storage locations 0 through n, corresponding to the respective network processing units NPU-0 through NPU-N. When a frame with the identifier or label m is sent to NPU-0, then the memory 0 corresponding to the label for the NPU-0 is sent the identified m for storage, indicating that NPU-0 is processing an input information unit whose identifier is m. It will be recalled that a later frame which has the same identifier m will belong to the same data flow and a frame which has a different identifier or label will represent a different data flow. Thus, if an input information unit having the label of 0 is received and dispatcher to NPU-1, then a 0 is recorded in the storage 1 corresponding to NPU-1. Then, if later a second input information unit from the same data flow (also with a label of 0) is received by the dispatcher 112 and assigned to processor NPU-N, the memory N also has stored the label of 0 representing that information unit being assigned to processor N.

The third memory 220 includes storage for each of the labels currently being processed by the n processing units. For each of the labels, the identifier of the processor assigned is stored, and, since the listing occurs sequentially, the first processor assigned to a particular message flow appears first in the memory. In this case, for label m, an entry 0 in memory 222 indicates that NPU-0 is processing an input information unit from that flow and for the label 0, a first unit is being processed by processor NPU-N as shown by memory 224 and a second unit is being processed by processor NPU-1 as shown by memory 226. For a given flow, the order in which the input information units arrived at the dispatcher is to be maintained so that the subsequent transmission of the same data flow can occur in the same order in which it was received, so it will be seen that the label memory 224,226 have the NPUs or processing units listed in the order in which the input frames were received from the network and dispatched to the N processors.

Figure 4:
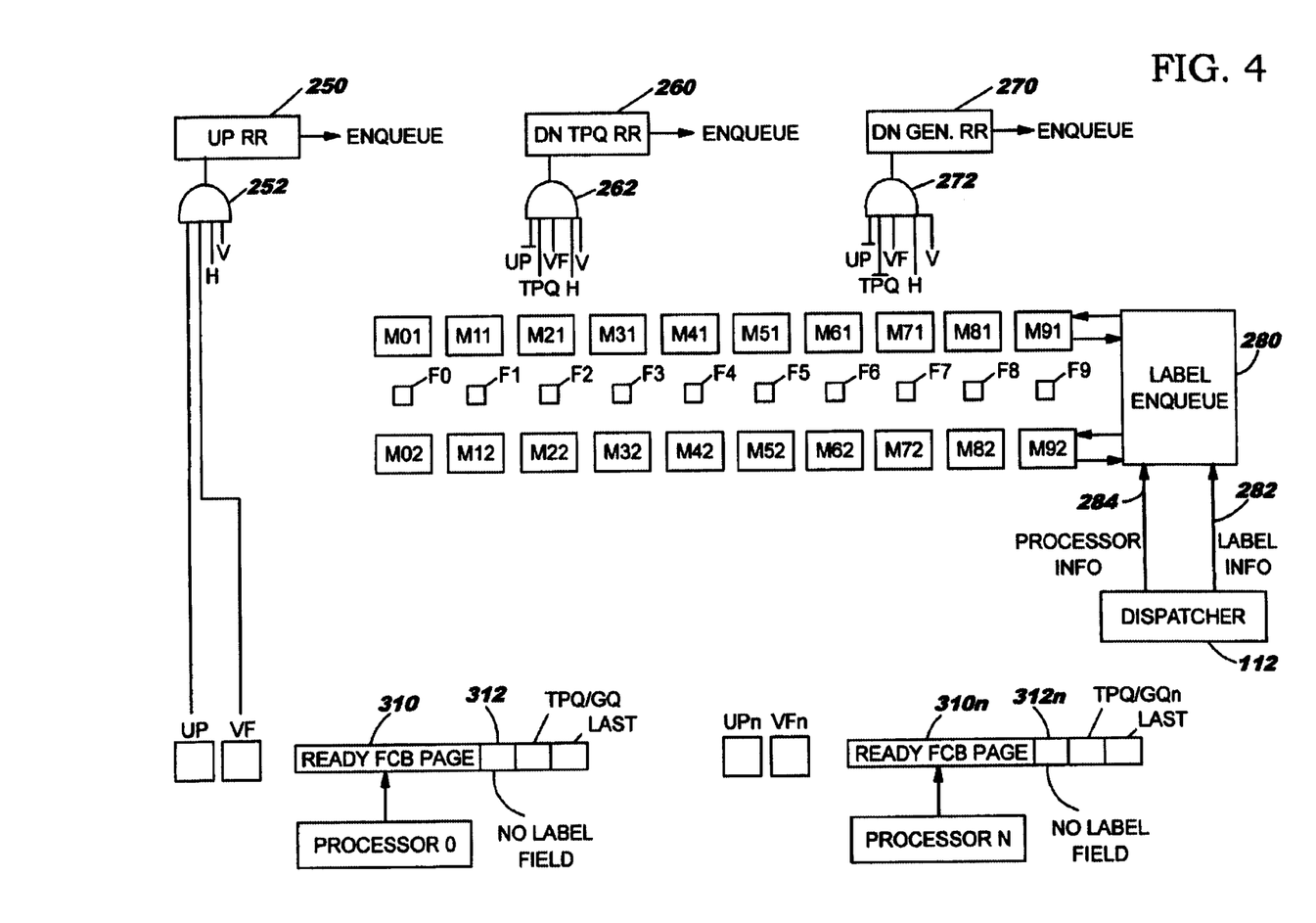
FIG. 4 is a detailed view of the completion unit of the present invention, with two label stores for each of the N processors.

FIG. 4 illustrates a more detailed structure of the completion unit 114 used in processing input information units and employing the data management techniques used in the present invention. The completion unit 114 as shown in this embodiment communicates with a plurality of round robin devices for distributing the output (e.g., processed information units) of the processing units, not shown in this FIG. 4. The plurality of round robin devices include an up-round robin 250 and two down round robin devices, one round robin identified as 260 for target ports (a small number of frequently used ports addressed specifically) and one round robin 270 for general distribution (processed information addressed to other ports than the specifically addressed target ports).

Logical AND gates 252, 262, 272 provide the gating for the round robins 250, 260, 270, respectively. For the AND gate 252 which provides a frame to the UP round robin 250, the inputs are that it be an UP frame (from the block UP associated with the Ready FCB page 310), that the frame be a valid frame (the indicator VF that it is a valid frame, ready for transmission), that the label field be valid in the associated frame label field (M01 through M92) and that the label be associated with a head of a message flow—the earliest The dispatcher 112 provides two pieces of information to the label enqueue 280 when a frame or input information unit is dispatched to a given processor—a label for the frame on line 282 and the identity of the processor to which the frame has been assigned on line 284. The label for the frame identifies the message flow to which the frame belongs, which, in the preferred embodiment, is based on the MAC plus the source address less the destination address, with the objective of providing a unique identifier for each message flow so that frames from the same message flow will have the same label and messages from different message flows will have different labels or identifiers.

Figure 5:
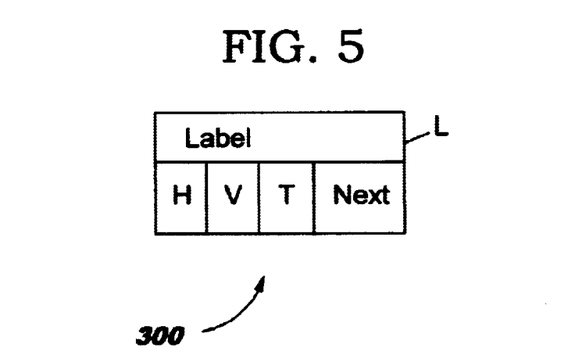
FIG. 5 is a schematic illustration of a label store for keeping track of the data flow being handled by each of the N processors.

FIG. 5 illustrates a format for the label field element 300 storing information associated with each of the N processors. Each of the N processors has two such label fields associated with it, one for the frame being processed and one for a frame which has been processed and is awaiting transfer out from the processing complex. The processed frame ready to be transferred is held in a memory or storage 310 which is sometimes referred top as a Ready FCB Page and one of these storage exists for each of the N processors.

The label field element 300 includes a label L, a head field H, a valid field V, a tail field T and a next field N. The label L is derived from the message content and represents a unique identifier for each of the data flows. The head field H identifies the beginning of a data flow or a chain of related frames currently being handled by the N processing units, either as work being processed or processed frames awaiting transfer out of the processing complex. Each data flow being processed in the processing complex of N processors has a head or beginning (or first-received frame for that data flow) somewhere in the N processors, and that beginning is identified as its "head" with a 1 in the head field H for its associated label field element. Similarly, each data flow in the processors also has a last frame currently in the N processors, and that last frame is identified as the tail by a 1 in the tail field T.

The valid field V indicates whether the processor contains real data (as it would from processing) indicated by a 1 in the valid field or if it does not, which is indicated by a 0 in the valid field V. When the processing first begins, no real or valid data exists in the system, so the valid field V is set to 0 as part of the initialization of the system. Later, as data is read out of the Ready FCB page 310 for a given processor, then the valid field V corresponding to that processors FCB Page is set to 0, indicating that the processor no longer has valid information corresponding to that label (since the information in the FCB page has already been passed along to the round robins; although the processor may still have valid information in the other label field associated with that processor because the processor itself may be working on a different frame). The next field N indicates the label field associated with the next frame in the same data flow—another one of the 2N label fields associated with the N processors. A label enqueue 280 receives a message from the dispatcher for each input information unit or frame that a given frame has been dispatched with its identifier for the data flow and the processor to which the frame has been dispatched.

Figure 6:
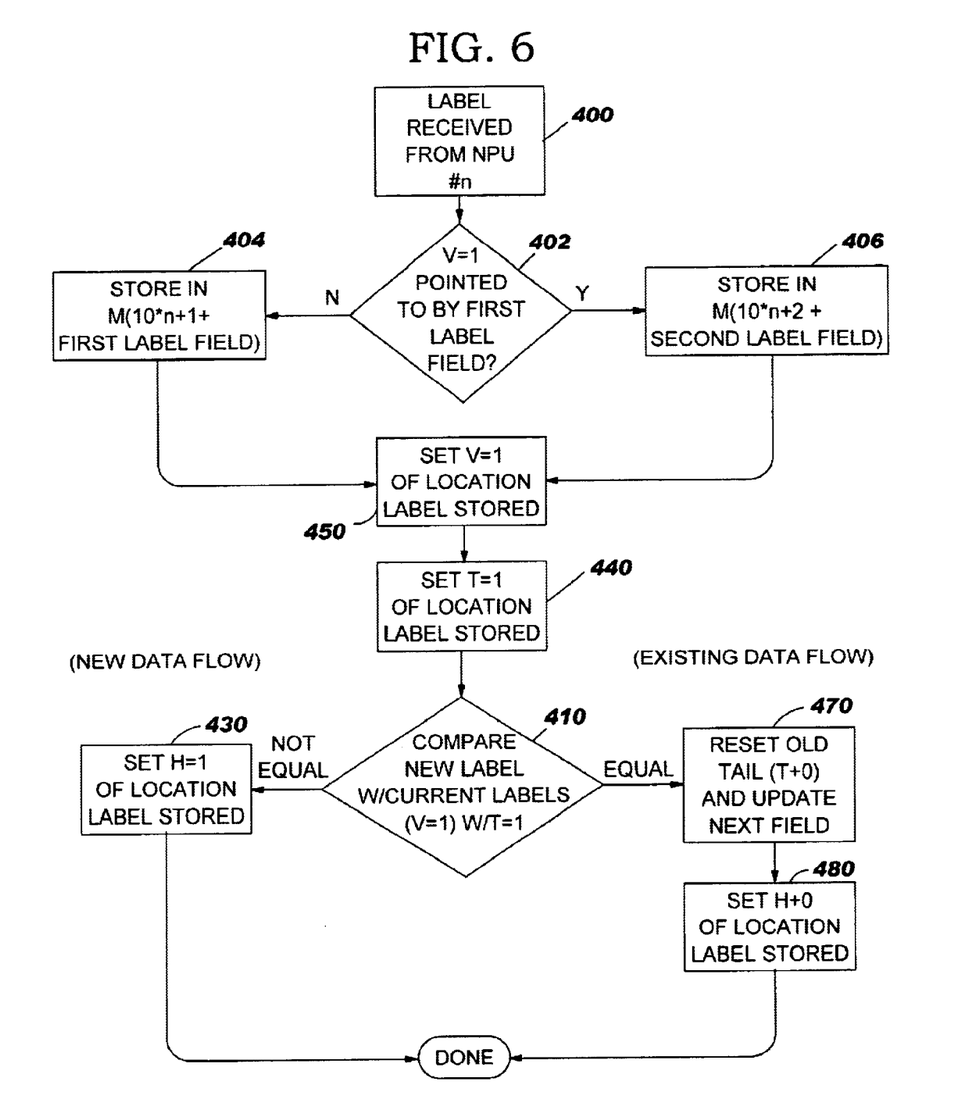
FIG. 6 is a flow chart illustrating the logic which is performed by the completion unit of FIGS. 3 and 4 in receiving a processing an indication that a new frame has been dispatched to one of the processing units.

FIG. 6 illustrates the flow of the label enqueue 350 of FIG. 4. As a frame is dispatched from the dispatcher 112 to one of the n processors, at block 400 a label for an input information unit or frame is sent to the label enqueue 350 on line 282 and an identification of which of the n processors is handling the frame on line 284. The first processing by the label enqueue 350 is at block 402 to determine whether the valid field V is 1 for the one storage to which the first label field point. If the valid field V is 1, then the storage pointed to is occupied, and the data should be stored in the other storage as indicated by block 406, otherwise the storage pointed to should be used at block 404. Next, at block 450, the valid field V for the appropriate storage is set to 1 to indicate that valid data is stored in that storage and at block 440 the tail indicator T for the current storage location is set to indicate that this is the last of the current data stream (until the next frame for the same data flow is received, at which time the tail field T is reset). Next, at block 410 the label is compared with the current labels being handled by any of the processors (of course, the valid field V must be 1 for these, indicating that this is a valid frame). The result of this comparison is either that the current label equals one already in process in which case control passes to block 470 or that it does not match any label currently in process, in which case control passed to block 430. If there is a match with one of the current labels, then the frame is a part of an existing data flow, so at block 470 the tail field T of the previous end of the data flow is reset (so T=0) and the next field pointer for that label field is set to point to the current frame's location. Then at block 480, the head field H is set to 0 indicating that the current frame is not the head of a data flow. If the label for the current frame was not equal to any label currently stored, then the current frame is a new data flow and the current frame is the beginning of it, so the head field H is set to 1 to indicate that status at block 430. After the processing of block 430 or block 480 to set up the appropriate flags, particularly the head field H, the process of linking to existing dataflows and setting up the fields or flags is done.

Figure 7:
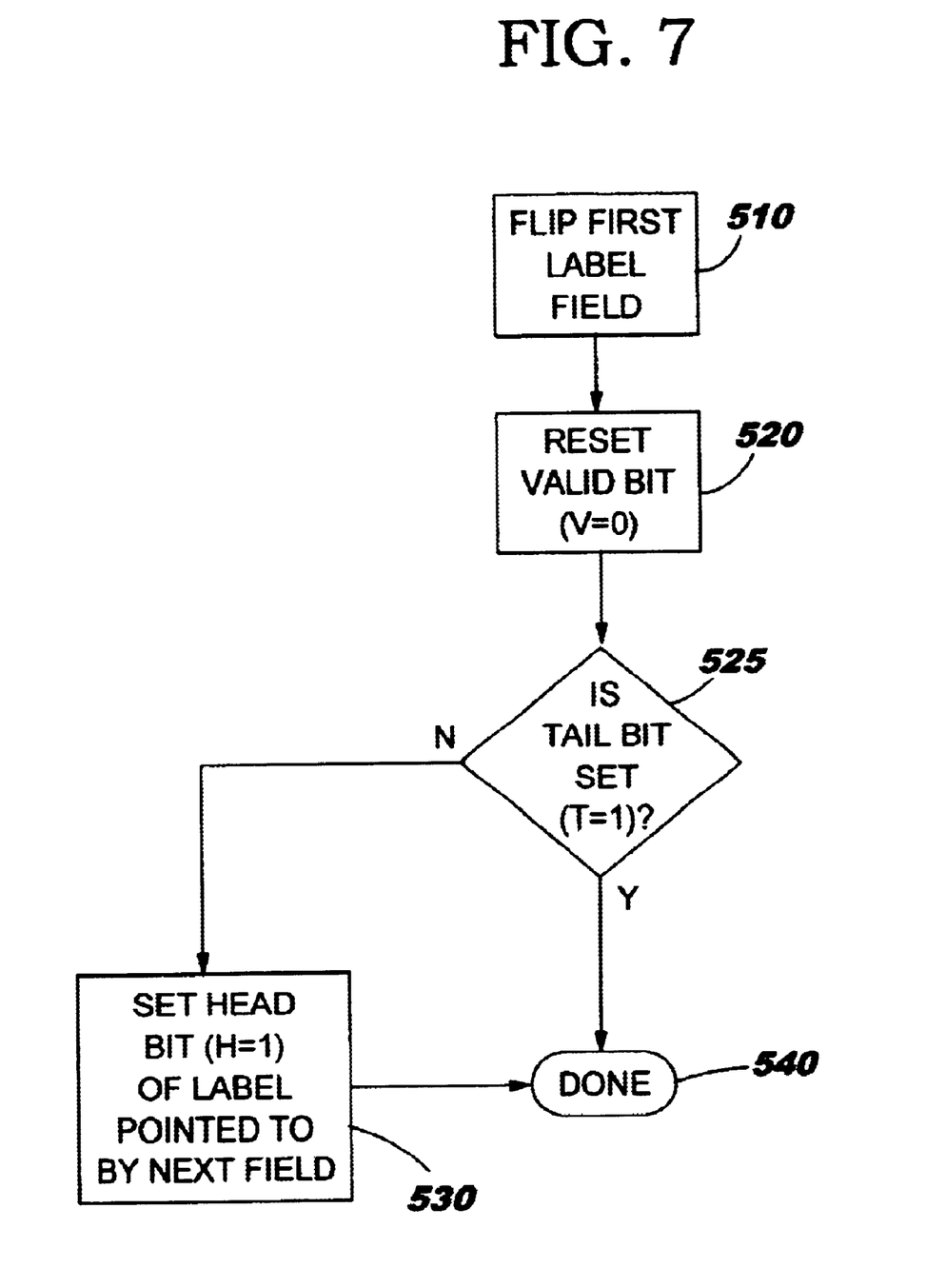
FIG. 7 is a flow chart illustrating the logic process performed by the completion unit when processing a report that the processing of a frame has been completed.

At FIG. 7 the process for processing out or delivering a frame out of the processors is shown. First, the first field indicator is flipped so that the pointer points to the other storage as the first or next field for the processor at block 510. Then, at block 520 the valid field V is reset to 0, indicating that the data is no longer valid (the frame has been dispatched out, and the data does not represent a frame currently being processed). Block 525 tests whether the tail field T is set (T=1) indicating that this is the last frame of a particular data flow. If it is, then control passes to block 540, indicating that the process is done. If not, at block 530, then the next frame in the succession is located (by the pointer in the next field) and its head bit or flag H is set to indicate that it is the first frame in that data flow presently in the processors. Then, from block 530 the setting of flags is done as indicated by block 540.

Figure 8:
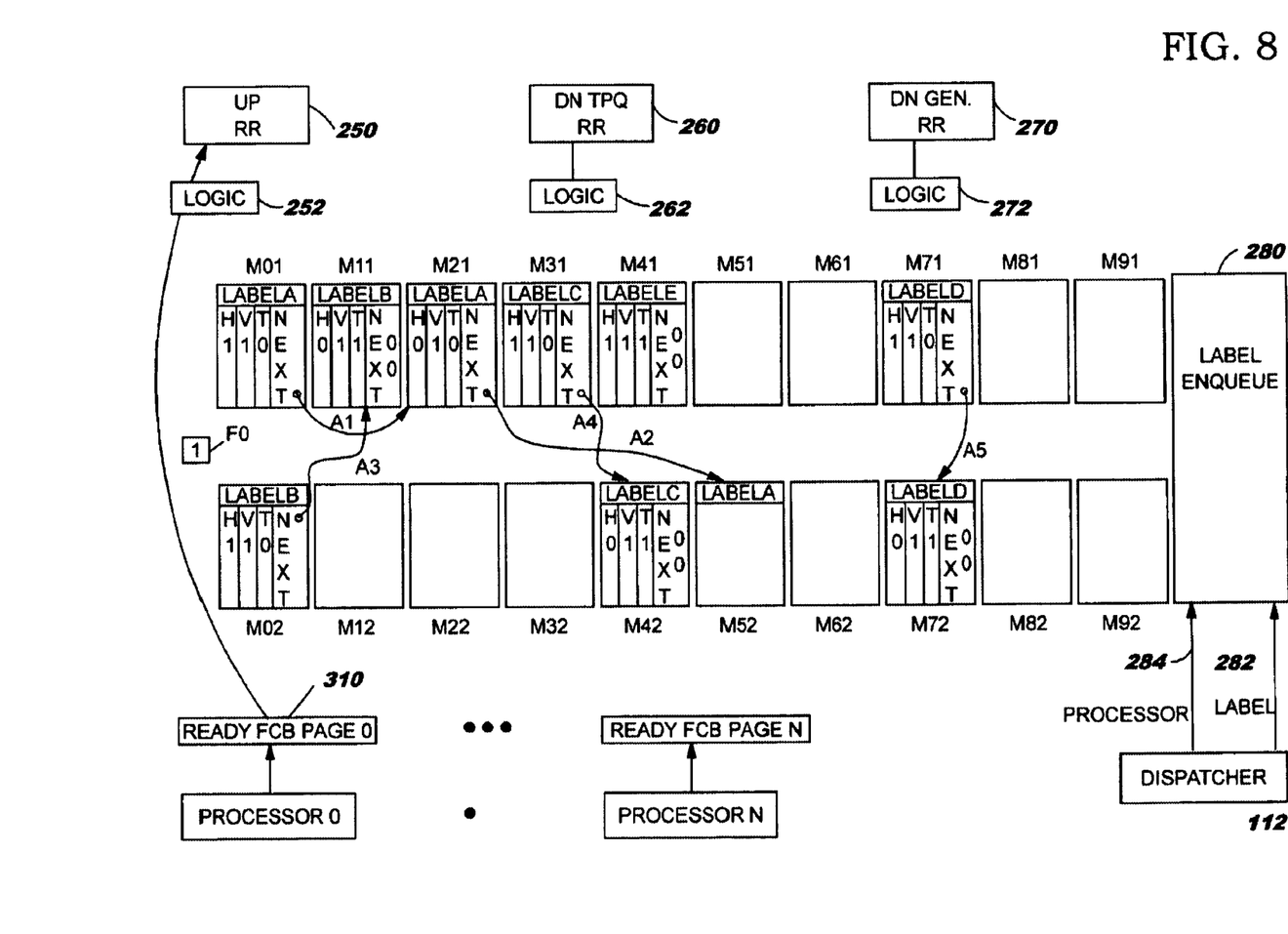
FIG. 8 is another view of the completion unit of FIG. 4, containing data to illustrate the operation of the completion unit in its preferred embodiment.

FIG. 8 illustrates the system of the present invention by an example, illustrating how several data flows could be accommodated by the completion unit described above with the logic of FIG. 6. The N processors with the dispatcher 112 and the completion unit have been working for some time, so FIG. 7 represents a snapshot of data stored in a portion of the completion unit, particularly with reference to the label storage. As shown in this figure, the label enqueue is coupled to the plurality of label memories, two for each of the N processors. Each of the processors also has associated with it an output buffer (sometimes referred to as the Ready FCB Page) for those processed frames which are awaiting transmission to the three round robins shown. Associated with each of the pair of label memories is the first label memory to indicate which of the label memories was received first (and, when both label memories are valid, the first label represents the one which is in the Ready FCB Page buffer and the second or later-received label represents the one currently being processed in the respective processor). Five separate data flows are depicted in this figure, although the number of data flows which are in progress at any given time depend on the system (particularly its size and the network traffic) and can vary over time. In this example, the ten processors are identified as processors 0 through 9 and the label memories are identified as memories M01 and M02 for processor 0 through label memories M91 and M92 for processor 9, although the number of processors is a design choice and subject to change, if desired. A first data flow with identifier A starts at label memory M01 as shown by the indication (H=1) that label memory M01 (and the corresponding reference to processor 0) represents a head of a chain or data flow. The next field N of label memory M01 points to label memory M21 to indicate that the processor 2 is handling the next information unit associated with this data flow. The next field of the label memory M21 points to label memory M52 which indicates that processor 5 has the next portion of this data flow. The set tail field for the label memory M52 indicates that this is the final or last portion of this data flow currently being processed in the N processors. The data flow sequence in this example is shown in this example by arrows A1 pointing from label memory M01 to label memory M21 and arrow A2 pointing from label memory M21 to label memory M52, to illustrate the logic connection between elements of the data flow (the arrows logically represent the pointers in the next field and do not exist physically in the actual implementation). Similarly, a data flow from label memory 02 to label memory 11 indicates by arrow A3 an order in the same data flow (although a different data flow from that described in connection with label memories M01, M21 and M52). A third data flow is indicated with arrow A4 in connection with label memories M31 and M42, with a fourth data flow indicated by arrow A5 between label memories M71 and M72. Finally, a fifth data flow is indicated at label memory 41 which has no arrow since it is a data flow presently including only a single label memory. This label memory 41 is both the head and the tail of the data flow and has no next field, since there is no other label memory associated with this data flow.

It will be remembered that, when there are two label memories associated with a single processor, one of the label memories represents a completed or processed information unit stored in a buffer and sometimes referred to as a Ready FCB Page, ready for transfer to the appropriate round robin unit for transmission from the processing complex, either up or down as the case may be, indicating that, for transfers up that it will be transferred to the interface device and for transfers down that it is being transferred back toward the data transmission network. In this case, processor 0, processor 4 and processor 7 include data in both of the associated label memories. Associated with each Ready FCB Page is also an UP field (indicating whether this is an up or a down page, as well as an indicator as to whether, if this is a down page, the frame is addressed to a target port or a general port, which determines whether to transfer a down page to the down target port round robin or to the general port round robin. If the earlier-received frame for processor 0 was the label memory M02 and that is both a head of a data flow and an up frame chosen by the up round robin device for the next transmission out of the processor complex and its buffer, then the FCB Page and associated data fields are removed from the Ready FCB Page, transferring the information to the up round robin. Then, the first label indicator is toggled to indicate that the other label memory M01 for processor 1 is now the first, and the valid field V for the label memory M02 is set to 0 indicating that this label memory is no longer active or valid and the valid field VF for the associated FCB page is reset to 0.

The present invention supports new data flows without disturbing the existing data flows and without needing to know about a new data flow in advance. A packet representing a new data flow (for example, a message from one of the processing units about its status) is simply stored with its identifying data and no reference to another data flow. Its lack of an identifier will not match the identifier for any of the existing data flows with a "no label" field set, a message which can go anytime. The present invention also allows for a flush command to override the processing of the data flows in respective order by allowing the system to process completed frames in the order in which those completed frames are received, ignoring the chaining of label field (the next pointers and the requirement that a given frame be a head before having access to the round robin devices which forward the frames). This may be accomplished by forcing "no label field" on the FCB Page. A single data flow will remain blocked until the head of the data flow has been processed, since in normal operation (without the flush alternative) only frames which are the head of the message flow will be considered for sending out to the round robins by the completion unit. However, each data flow has its own head, so one data flow may be blocked but the other data flows can continue to process and send out completed information units to the round robins without interruption or hindrance and without intervention. This is particularly useful in the instance where a single data flow is halted (for example, a processor fails or cannot process one element of a single data flow) that the other data flows are not halted or the entire processing would stop until the single data flow were rectified.

Of course, many modifications of the present invention will be apparent to those skilled in the relevant art in view of the foregoing description of the preferred embodiment, taken together with the accompanying drawings. For example, the data storage described in connection with the preferred embodiment of the present invention could be substantially modified without departing from the spirit and the advantages of the present invention. The labels which are stored could be generated in other ways that based on the message content, or could simply be a consecutive numbering of the data flows identified by the dispatcher. The use of a file to keep track of the frame distribution to successive processors could be replaced with an round robin arrangement where each processor is assigned work on a successive basis, rather than assigning frames to an available and idle processor, which then requires some attention to the order in which processors are employed. Additionally, the use of a separate storage could be altered, if desired, and the individual records could maintain a sequence number, if desired, although that system would not identify which frames were missing and where they were sent, if a frame should become missing. The number of independent processors is also a matter of design choice and, although disclosed as ten in the preferred embodiment, could be as few as 2 or 3 and as many as can be fit onto the device and the relevant data managed, although the complexity increases as the number of processing units increases. Many other modifications and adaptations to the present system could be employed to advantage without departing from the spirit of the present invention, and some of the advantages of the present invention could be achieved without the corresponding use of other related features. Accordingly, the foregoing description of the preferred embodiment should be considered as merely illustrative of the principles of the present invention and not in limitation thereof.

Having thus described the invention, what is claimed is:

1. A system for processing frames from a network comprising:
   a substrate;
   N processing units formed on the substrate, where N>1;
   a dispatch unit formed on the substrate for receiving an input information unit and assigning that to one of the N processors;
   a completion unit formed on the substrate for transmitting processed information units from the substrate; and
   memory operatively connected to the dispatch unit, the N processing units and the completion unit for storing the identity of the processing unit assigned by the dispatcher for the processing of the input information unit, said memory storing the identity being used by the completion unit to assemble the processed information units into the same order as the input information units.

2. A system including the elements of claim 1 and further including an indicator that the processed information units are to be transmitted from the substrate in the order in which the processed information units are received, with said completion unit responding to the indicator to dispatch processed information units as they are completed by one of the N processing units.

3. A system of the type set forth in claim 2 wherein each information unit is identified with an identifier indicating its data flow and later information units from the same data flow are linked to the earlier information unit from the same data flow, with the earlier one in the processors being identified as the first information unit in a particular data flow and the transmission of information units from the processing units is limited to those information units which are identified as the first information unit for the particular data flow.

4. A method of processing in an interface device an ordered series of frames received from a network, the steps of the method comprising:

receiving input information units in order from the network;

assigning each input information unit to one of a plurality of independent processors in the order in which the input information units were received from the network;

recording in a first memory an identifier for each information unit assigned to one of the independent processors and recording, in association with the identifier, the identity of the processing unit to which the processing unit was assigned;

processing the input information unit at the assigned processing unit and storing a completed information unit in a second memory;

retrieving from the second memory containing completed information units those completed information units in the order specified in the first memory for transmission to the network, whereby the completed information units are transmitted to the network in the same order in which the input information units were received from the network.

5. A method of processing frames including the steps of the method set forth in claim 4 and further including:

responding to a frame generated by a processing unit by including a no label flag on the frame.

6. A method of processing frames including the steps of claim 5 where system responds to a frame with a no label flag by passing the frame to the network without further storage.

7. A system for processing information units received from a network and comprising:

a plurality of independent processing units, each for receiving an input information unit and processing the information unit, generating output information units;

a dispatch unit coupled to the plurality of independent processing units which recognizes that an input information unit has been received from the network and assigns the information unit to one of the independent processing units for processing;

a completion unit for transferring output information units to the network;

a controller for providing the output information units are transferred to the network after processing by a processor in the same order in which the input information units were received from the network, the controller including:

a first storage for recording a tag for each input information unit sent by the dispatch unit to a processing unit;

a second storage for recording which of the plurality of processing units is processing each input information unit; and a third storage including storage for each output information units from the processing units in sequential order for each processing unit; and a transferring device for removing information units from the third storage in the order specified in the first storage unit.

8. A system of the type described in claim 7 for transferring processed information units to the network in the same order as the information units were received from the network, the system further including a handling system for processing new information units which were not received from the network, the handling system including putting a symbol on new information units that indicates that such new information units were not received from the network.

9. A system for processing information units from the network of the type described in claim 7 wherein the system further includes a signal for overriding the order and for transferring output information units to the network in the order in which the information units were received.

10. A system for processing information units comprising:

a memory for storing a plurality of information units to be processed in the order in which the information units are received;

a plurality of independent processing units;

a dispatch unit for assigning each information unit to one of the plurality of independent processing units, said dispatch unit storing sequentially in a queue an identifier for each information unit and the identity of the processing unit to which the information unit was dispatched for processing;

a completion unit for transmitting processed information units from the system, said completion unit being coupled to the sequential queue the identifier for each information unit assigned by the dispatcher and the identity of the processing unit to which the information unit was dispatched, whereby the completion unit may assemble the processed information units in the same order in which the information units were received.

* * * * *